(12) United States Patent
Blanco et al.

(10) Patent No.: US 6,539,482 B1
(45) Date of Patent: Mar. 25, 2003

(54) NETWORK ACCESS AUTHENTICATION SYSTEM

(75) Inventors: Marcos Ares Blanco, Grenoble (FR); Regis Marco, Meylan (FR)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/288,418

(22) Filed: Apr. 8, 1999

(30) Foreign Application Priority Data

Apr. 10, 1998 (EP) ............................. 98410038

(51) Int. Cl.[7] ............................. H04L 9/32; G06F 11/00
(52) U.S. Cl. ..................... 713/201; 713/202; 713/200; 713/183; 713/184; 713/182
(58) Field of Search ................ 713/202, 201, 713/200, 182, 183, 184

(56) References Cited

U.S. PATENT DOCUMENTS

| | | | | |
|---|---|---|---|---|
| 4,926,481 A | * | 5/1990 | Collins, Jr. ................. 713/184 |
| 5,359,660 A | * | 10/1994 | Clark et al. ................. 713/201 |
| 5,434,918 A | | 7/1995 | Kung et al. |
| 5,455,953 A | | 10/1995 | Russell |
| 5,495,235 A | * | 2/1996 | Durinovic-Johri et al. . 340/5.27 |
| 5,581,700 A | * | 12/1996 | Witte ........................ 713/202 |
| 5,586,260 A | | 12/1996 | Hu |
| 5,684,869 A | * | 11/1997 | Palumbo et al. ............ 379/182 |
| 5,694,595 A | * | 12/1997 | Jacobs et al. ................. 707/9 |
| 5,991,810 A | * | 11/1999 | Shapiro et al. ............. 709/229 |
| 6,049,602 A | * | 4/2000 | Foladare et al. ....... 379/265.04 |
| 6,081,900 A | * | 6/2000 | Subramaniam et al. ..... 713/201 |
| 6,301,368 B1 | * | 10/2001 | Bolle et al. ................. 382/100 |
| 6,308,200 B1 | * | 10/2001 | Yamamoto .................. 709/206 |
| 6,308,213 B1 | * | 10/2001 | Valencia ..................... 709/229 |
| 6,345,266 B1 | * | 2/2002 | Ganguly et al. ............... 707/1 |

* cited by examiner

Primary Examiner—Ly V. Hua
(74) Attorney, Agent, or Firm—Meyertons, Hood, Kivlin, Kowert, & Goetzel, P.C.; B. Noël Kivlin

(57) ABSTRACT

A network access authentication system including a directory service containing a remote access password and a standard access password for each user of the network, using an authentication protocol that provides information on whether a user is accessing the network locally of remotely, and including a front-end between the directory service and the authentication protocol. The front-end executes the steps of:

receiving a user identifier and a user password entered by a user through said authentication protocol;

retrieving from the directory service the remote access password and the standard access password corresponding to the user identifier;

if the authentication protocol indicates a remote access, comparing the user password to the remote access password, else comparing the user password to the standard access password; and granting access to the network if the comparing step is successful.

16 Claims, 3 Drawing Sheets

NETWORK ACCESS AUTHENTICATION SYSTEM

Priority is hereby claimed to EP Patent Application No. 98410038.8 entitled "Network Access Authentication System", filed Apr. 10, 1998.

FIELD OF THE INVENTION

The present invention relates to an authentication system for users which may access a network locally or remotely.

DISCUSSION OF THE RELATED ART

FIG. 1 illustrates an exemplary network. The network includes a network server 10 having a mass storage device 10-1 and several local clients 12 connected to each other and to server 10 through a network line 14, such as an Ethernet link.

The network may also include a Network Access Server (NAS) 16 connected to link 14, that allows remote clients 18 to connect to the network, for example through a modem and a telephone line. In this manner, users may access their business network from home.

In order to have access to a network, a user must first be authenticated, i.e. he must provide a user identifier and a password which must match authentication data previously created for the user by the network administrator. Such data is usually stored in a user data file on the network server 10.

Usual network transport protocols, such as TCP/IP, are not specifically intended for authentication. Therefore, specific protocols are used on top of the transport protocols, some of which are dedicated to authentication and some others, although not dedicated, may be used for authentication. The non-dedicated protocols (such as NIS), which may convey passwords as clear text, are often used on small local area networks (LAN) where strong security is not an issue. If more security is needed, dedicated authentication protocols, such as RADIUS (Remote Authentication Dial In User Service) or TACACS, are used.

With the RADIUS protocol, a NAS operates as a client of RADIUS. The client is responsible for passing user information to designated RADIUS severs, and then acting on the response which is returned. RADIUS servers are responsible for receiving user connection requests, authenticating the user, and then returning all configuration information necessary for the client to deliver service to the user.

A RADIUS server can act as a proxy client to other RADIUS servers or other kinds of authentication servers.

Transactions between the client and RADIUS server are authenticated though the use of a shared secret, which is never sent over the network. In addition, any user passwords are sent encrypted between the client and RADIUS server, to eliminate the possibility that someone snooping on an unsecure network could determine a user's password.

The RADIUS server can support a variety of methods to authenticate a user. When it is provided with the user name and original password given by the user, it can support PPP PAP or CHAP, UNIX login, and other authentication mechanisms.

All transactions are comprised of variable length Attribute-Length-Value 3-tuples. New attribute values can be added without disturbing existing implementations of the protocol.

TACAS is an industry standard specification that forwards user name and password information to a centralized server. The centralized server can either be a TACACS database or a database like the UNIX password file with TACACS protocol support. For example, the UNIX server with TACACS passes requests to the UNIX database and sends accept or reject messages back to the access server. XTACACS is an extension of the TACACS protocol that authorizes connections with SLIP enable, PPP (IP or IPX), ARA, EXEC, and Telnet.

The protocols mentioned in the present application and others are well documented in RFC (Request For Comments) papers available on Internet at:

www.nexor.com/public/rfc/index/rfc.html.

In particular, the RADIUS and TACACS protocols are documented in RFC papers 1492, 2058 and 2138 which are incorporated herein by reference.

All these protocols require different user data files. As a consequence, in a large network where many protocols coexist, a user may have data stored in several different files scattered on the network. This makes the network administration complex, since the administrator will have to update several files each time he creates a user or modifies the data of an existing user. There may even be several administrators in charge of different services. Unless these administrators attempt to synchronize with each other, the user ends up with several user identifiers and passwords which will be difficult to remember.

For improving the security of a network providing remote access, it is usually recommended to use at least two different passwords, one for remote access and the other for local access.

SUMMARY OF THE INVENTION

An object of the invention is to provide an authentication procedure which allows a centralized administration of user data without creating security breaches in networks providing remote access.

This object and others are achieved by an authentication system including a directory service containing a remote access password and a standard access password for each user of the network, using an authentication protocol that provides information on whether a user is accessing the network locally or remotely, and including a front-end between the directory service and the authentication protocol. The front-end receives a user identifier and a user password entered by a user through the authentication protocol, and retrieves from the directory service the remote access password and the standard access password corresponding to the user identifier. If the authentication protocol indicates a remote access, the front-end compares the user password to the remote access password, else it compares the user password to the standard access password. Access to the network is granted if the comparison is successful.

The directory service may additionally contain a remote access password enable flag for each user of the network. In this case, if the authentication protocol indicates a remote access corresponding to the remote access enable flag and the remote access enable flag has an active state, the front-end compares the user password to the remote access password, else it compares the user password to the standard access password. Access to the network is granted if the comparison is successful.

According to an embodiment of the invention, the front-end behaves as a client for a protocol used by the directory service and as a server for the authentication protocol, and exchanges information between the authentication protocol and the directory service protocol using a protocol attribute translation table.

According to an embodiment of the invention, several authentication protocols are used on the network and one front-end is provided for each authentication protocol.

The foregoing and other objects, features, aspects and advantages of the invention will become apparent from the following detailed description of embodiments, given by way of illustration and not of limitation with reference to the accompanying drawings.

DESCRIPTION OF THE PREFERRED EMBODIMENTS

An aspect of the invention is to gather all the data concerning the network users, including their authentication data, in a data base of a directory service. A directory service is a combination of a data base, or directory, and a specific protocol allowing access to the directory through a network. A directory contains information of any type.

A preferred embodiment of the invention uses the Lightweight Directory Access Protocol (LDAP). The LDAP protocol is designed to provide access to directories supporting the X.500 models, while not incurring the resource requirements of the X.500 Directory Access Protocol (DAP). This protocol is specifically targeted at management applications and browser applications that provide read/write interactive access to directories. When used with a directory supporting the X.500 protocols, it is intended to be a complement to the X.500 DAP. The protocol is carried directly over TCP or other transport, bypassing much of the session/presentation overhead of X.500 DAP. Most protocol data elements can be encoded as ordinary strings (e.g., Distinguished Names). The protocol can be extended to support new operations, an controls may be used to extend existing operations.

The LDAP protocol and related information are documented in RFCs 1777, 1778, 2251, 2252 and 2256 which are incorporated herein by reference and available on Internet at:

www.nexor.com/public/rfc/index/rfc.html.

Figure 1:
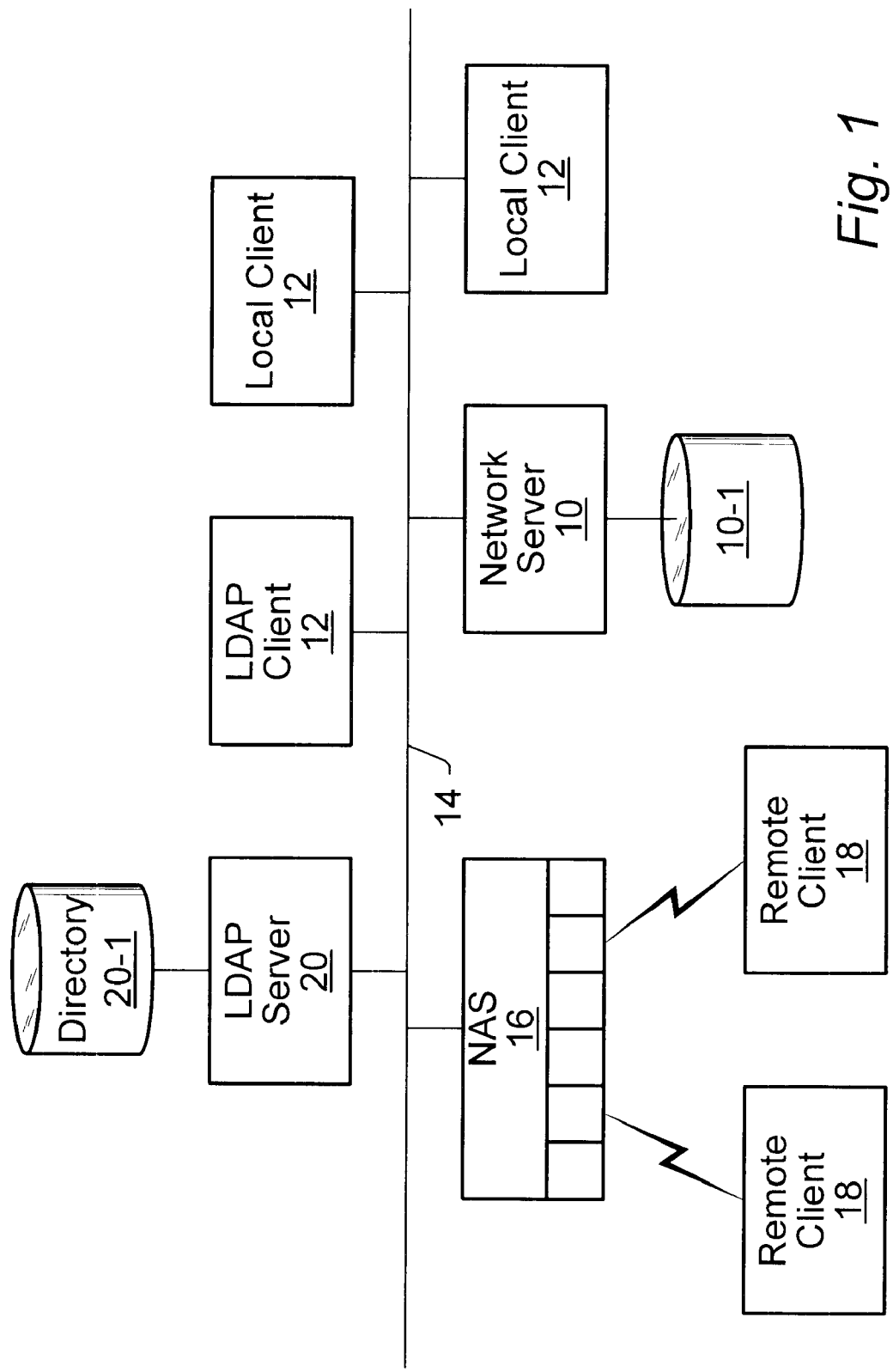
FIG. 1 schematically shows an exemplary network.

As shown in FIG. 1, a network according to the invention is connected to a server 20 hosting a directory service associated with a directory stored on a mass storage device 20-1. This directory will contain all the data, especially the authentication data, concerning the network users. Although FIG. 1 shows a server 20 dedicated to the directory service, the directory service could also be hosted by the main network server 10.

The directory is accessible through a network client using the appropriate protocol (an LDAP client 12 in FIG. 1).

A goal of the invention is to make any authentication procedure on the network use the authentication data stored in the directory. In this manner, since the same authentication data is accessible to all the authentication procedures, this authentication data in principle only needs to contain one user identifier and one password. In practice, the authentication data will contain two passwords for security reasons if the network offers remote access. This will considerably increase the comfort of the users and simplify the network administrator's tasks.

Making any authentication procedure use the directory service is however not straightforward. Although directory service protocols, such as LDAP, provide authentication possibilities for restricting access to the directory, they are not compatible with the protocols used for user authentication on the network, such as RADIUS and TACACS.

Another difficulty results from the coexistence of two passwords, recommended when the network offers remote access. The protocols used for authentication only convey a single password, the one entered by the user, which may be the remote access password or the standard access password. Although the usual authentication protocols convey information on the access mode (remote or local), such information is not exploitable by the directory service protocols for retrieving the right password among the two passwords stored in the directory for a user.

Figure 2:
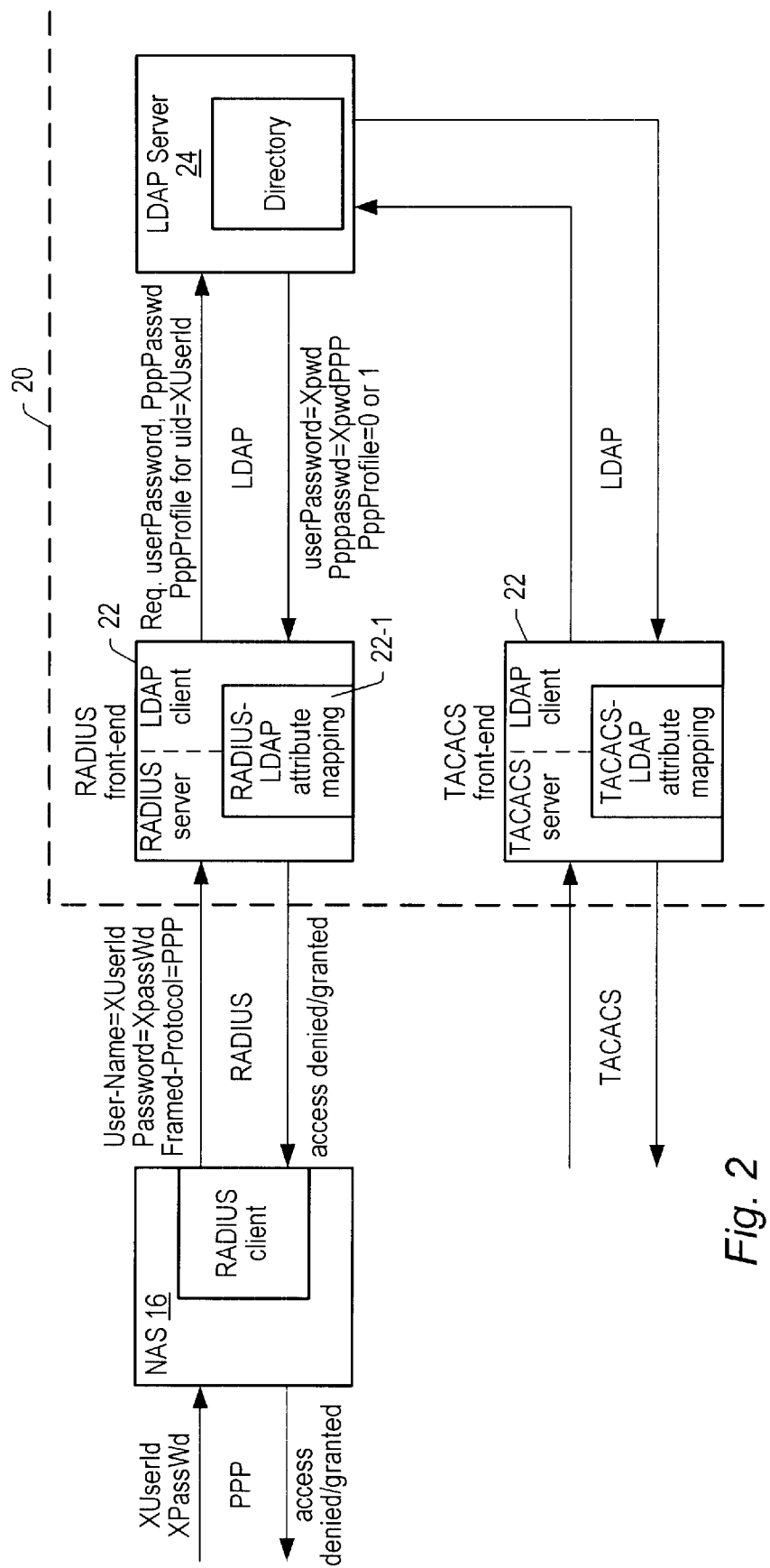
FIG. 2 illustrates an exemplary data flow of an authentication system according to the invention.

FIG. 2 illustrates how these difficulties are overcome according to the invention. It shows an exemplary data flow of an authentication system according to the invention. A front-end application 22 is provided for each protocol which is used on the network for authentication. FIG. 2 shows, as an example, a RADIUS front-end and a TACACS front-end. Each front-end is an interface between the central directory service 24 and a client using the corresponding authentication protocol. For this purpose, each front end behaves as a client of the directory service and therefore exchanges information with the directory service using the directory service protocol, LDAP in the preferred embodiment. Moreover, the front-end behaves as the server for the clients using the corresponding authentication protocol. As shown, a NAS (network access server) 16 runs a RADIUS client which will exchange authentication information with the corresponding front-end 22 by using the RADIUS protocol. Remote clients connect to the NAS 16 using, for example, the Point-to-Point Protocol (PPP).

The front-ends 22 are, in a preferred embodiment, implemented within the computer 20 hosting the directory service. They can however be implemented in other computers connected to the network.

The directory is maintained by an administrator using a conventional LDAP client (shown in FIG. 1).

When a remote user wishes to access the network, he provides a user identifier XUserId and a password XPassWd. This information is passed to the RADIUS client application which conventionally carries out a RADIUS authentication transaction with the available RADIUS server, i.e. the RADIUS front-end according to the invention.

According to the RADIUS protocol, like for other high-level protocols such as TACACS and LDAP, information is exchanged in the form of attributes. Each attribute has a unique attribute identifier and an attribute value.

During the RADIUS authentication transaction, the client will in particular pass to the RADIUS server the attributes "User-Name" with the value XUserId (the user identifier entered by the remote user), the attribute "Password" with the value XPassWd (the password entered by the remote user), and the attribute "Framed-Protocol" with a value indicating if a remote access protocol is used and if so, which one (in this case PPP). In practice, the password XPassWd will be encrypted on the PPP link and decrypted by the NAS 16. The RADIUS client will again encrypt the password conforming to the RADIUS specifications.

The RADIUS server needs to compare the user identifier and the password with predefined values which, in a conventional system, are stored in a dedicated file. According to the invention, the front-end's RADIUS server, instead of retrieving this data in a file, will make the front-end's LDAP client fetch it from the directory service 24. For this purpose, the front-end converts the required RADIUS attributes to LDAP attributes using an attribute mapping table 22-1. In particular, the RADIUS attribute "User-Name" is mapped to the LDAP attribute "uid". The LDAP client then conventionally issues a request to the LDAP server for data associated to attribute "uid" having value XUserId (the user identifier). The LDAP server conventionally returns the requested attributes with their corresponding values stored in the directory.

In FIG. 2, the requested attributes are, for example, "userPassword", which is a password to use for local or standard accesses, "PppPassWd" which is a password to use normally for remote accesses, and "PpProFile" which is a flag that indicates if the user should use his remote access password or not when using a remote access. Depending on the values of these attributes and those received from the RADIUS client, the front-end's RADIUS server will either deny or grant access to the network.

Figure 3:
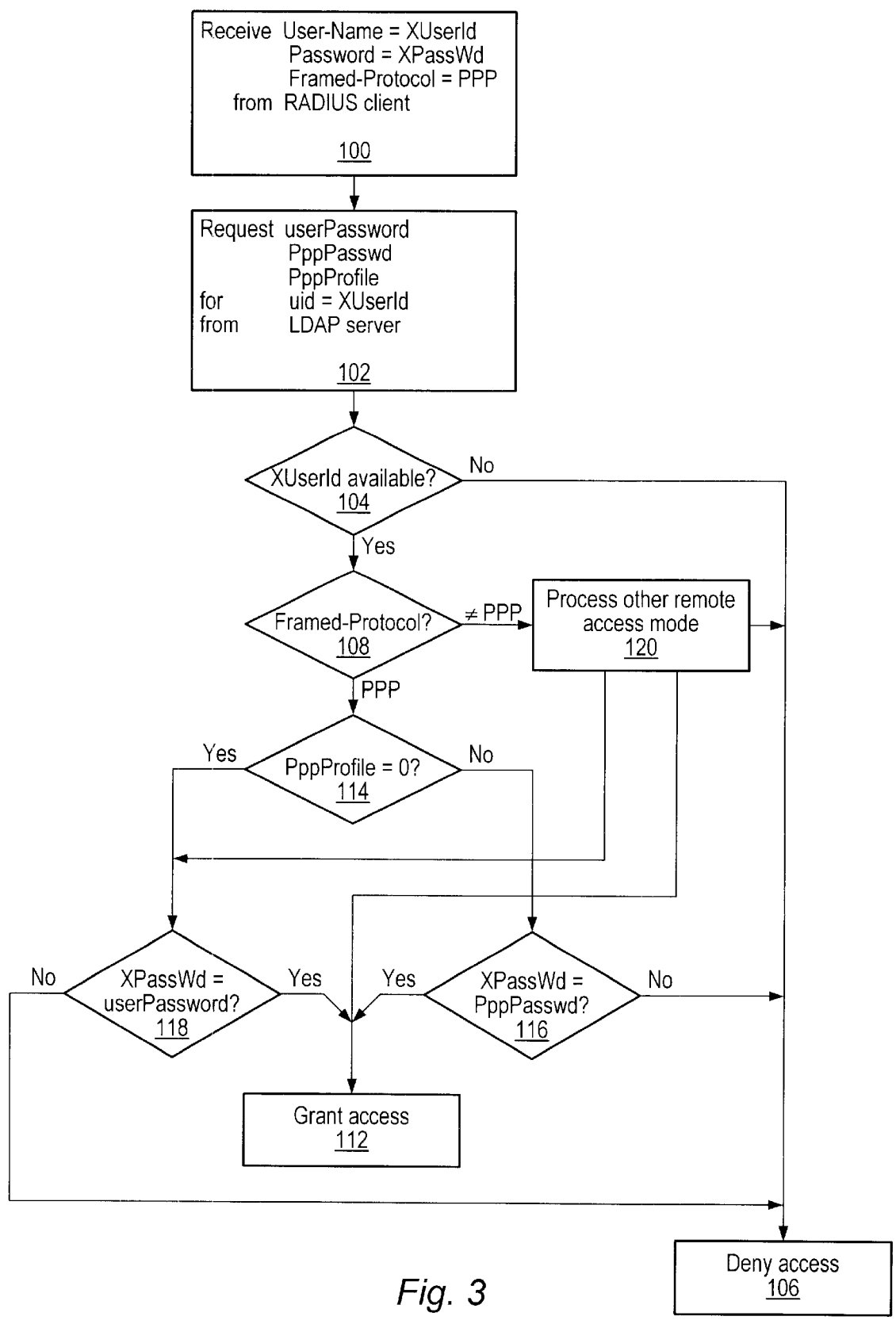
FIG. 3 is a flow chart of operations achieved by a front-end application of FIG. 2 during an authentication operation according to the invention.

FIG. 3 shows an exemplary flow chart of the operations carried out by the RADIUS front-end of FIG. 2 when a user wishes to access the network remotely.

At 100, the front-end receives from the RADIUS client the attributes corresponding to the user identifier XUserId, the entered password XPassWd, and the type of the remote access protocol, PPP. The two first values are provided by the user whereas the third value is provided by the RADIUS client which is aware of the type of remote access protocol used.

At 102, the RADIUS attribute "User-Name" is mapped to the LDAP attribute "uid" with the user identifier value XUserId. An LDAP request is then issued to retrieve from the directory the attributes "userPassword", "PppPassWd" and "PppProFile" from an entry corresponding to value XUserId for attribute"uid".

At 104, if the LDAP server cannot satisfy the request because no entry corresponds to XUserId, the access to the network is denied at 106. Else, at 108, the value the "Framed-Protocol" attribute is checked.

If at 108 the "Framed-Protocol" attribute indicates a PPP access, it is checked whether the "PppProfile" flag is zero at 114. The "PppProfile" flag is optional and allows the administrator to force a user either to always use the same password, i.e. the standard access password, whether he is accessing the network remotely or not, or to force the user to use different passwords depending on the access mode.

If the "PppProfile" attribute is not zero at 114, the password XPassWd entered by the user is compared to the value of attribute "PppPassWd" at 116. If the comparison fails, access is denied at 106. Otherwise, access is granted at 112.

If the "PppProfile" attribute is zero at 114, the password XPassWd entered by the user is compared at 118 to the value of attribute "userPassword" returned by the LDAP server.

If the comparison fails, access is denied at 106, whereas, if it is successful, access is granted at 112.

If, at 108, the "Framed-Protocol" attribute does not indicate a PPP access, the same steps as carried out for the PPP access mode from 114 are carried out at 120 for any other possible access mode identified by the "Framed-Protocol" attribute. For example, if another possible remote access mode is SLIP, an enable flag "SlipProfile" and a password attribute "SlipPassWd" may be set for the user in the directory. The values of these attributes are compared respectively to zero and to the password XPassWd at steps similar to steps 114 and 116. Access is then granted or denied at steps similar to 112 or 106 if the flag "SlipProfile" is non zero.

If flag "SlipProfile" is zero of if no remote access mode is identified, the password XPassWd is compared to the value of attribute "userPassword" at 118 before granting or denying access.

It is apparent from the flowchart of FIG. 3 that an administrator may set at least two different passwords for a user in the directory. The administrator may force the user to use different passwords depending on the access mode (local or remote) and thus improve the security of the network. This feature may be overridden if the administrator sets the "PppProfile" attribute to 0. The user will then only use one password independently of the access mode, which may improve his comfort.

Provided that the system according to the invention has a front-end for each authentication protocol used on the network, it allows each user to have single user identifier and a reduced number of passwords usable for any access or service on the network needing an authentication. The security of the network is improved when the administrator forces the user to have two passwords, one for local accesses, the other for remote accesses. An advantage of the system is that different front-ends may share the same password (PppPassWd, SlipPassWd) for the same access mode (PPP, SLIP).

User entries in the directory are customized for the needs of the invention, i.e. they have specific attributes which are not necessarily defined in existing directories. Directory service protocols, such as LDAP, are extensible in that an administrator may define new entry types in the directory, when entries may inherit attributes from pre-existing entry types or have newly defined attributes.

With LDAP, each entry of the directory is an instance of an "object class". An object class defines the attributes which must be used and the attributes which may be used in a corresponding entry. In this manner, new entry types may be added to the directory, transparently, provided that the LDAP client and the LDAP server both use the same object class definitions. An LDAP object class definition for user entries having the attributes exemplified above would be:

objectclass RemoteUser
superior top
requires
   uid
allows
   userPassword
   PppPassWd,
   PppProFile,
   SlipPassWd,
   SlipProfile, The statement "superior top" indicates that the object class inherits from the attributes of a previously defined object class "top". The statement "requires" is followed by a list of attributes that all the corresponding entries of the directory must have. The statement "allows" is followed by a list of attributes which are optional.

An instance of this object class, i.e. a corresponding entry in the directory, could be defined as follows:

dn:uid=XUserId, 1=?, o=?, c=?
objectclass=RemoteUser
uid=XUserId
userPassword=XPassWd
PppPassword=XPassWd2
PppProfile=1.

The statement "dn:" defines the "distinguished name" which is a unique identifier for the entry. This distinguished name is defined so that the entries are organized hierarchically. For example, it defines the country "C", the organization "o", the location or city "1", and finally the user "uid". The statement "objectclass=RemoteUser" identifies the object class to which the entry belongs.

For ease of comprehensive, only a limited number of attributes have been described, allowing a minimum authentication procedure. In practice, authentication procedures use more attributes, such as password expiration dates, check information, encryption keys, information for logging and debugging purposes . . . Those skilled in the art will add such attributes to the entries and object classes of a directory service and build the corresponding mapping tables in the front-ends for the various protocols which may be used for authentication.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A network access authentication system including:
    a directory service containing a remote access password and a standard access password for each user of the network;
    an authentication protocol that provides information on whether a user is accessing the network locally or remotely; and
    a front-end between the directory service and the authentication protocol, for receiving a user identifier and a user password entered by a user through said authentication protocol, retrieving from the directory service the remote access password and the standard access password corresponding to the user identifier, and granting access to the network when the authentication protocol indicates a remote access and the user password equals the remote access password, or when then authentication protocol indicates a local access and the user password equals the standard access password.

2. The authentication system of claim 1, wherein the front-end is a client for a protocol used by the directory service and a server for the authentication protocol, and includes a protocol attribute translation table for exchanging information between the authentication protocol and the directory service protocol.

3. The authentication system of claim 1, wherein the directory service uses the Lightweight Directory Access Protocol (LDAP), whereby each entry in the directory service is an instance of a predefined object class defining attributes which are used by the entry, a specific object class being created for the network users, that defines the attributes necessary for authenticating the users.

4. The authentication system of claim 1, wherein the front-end is an application executed on a computer hosting the directory service.

5. The authentication system of claim 1, including several authentication protocols and one front-end for each authentication protocol.

6. A network access authentication system including:
    a directory service containing a remote access password, a standard access password, and a remote access password enable flag for each user of the network;
    an authentication protocol that provides information on whether a user is accessing the network locally or remotely; and
    a front-end between the directory service and the authentication protocol for receiving a user identifier and a user password entered by a user through said authentication protocol, retrieving from the directory service the remote access password, the standard access password, and the remote access password enable flag corresponding to the user identifier, and granting access to the network if the authentication protocol indicates a remote access, the remote access enable flag has an active state, and the user password equals the remote access password, else if the authentication protocol indicates a local access or the remote access enable flag has an inactive state, and the user password equals the standard access password.

7. The authentication system of claim 6, wherein the front-end is a client for a protocol used by the directory service and a server for the authentication protocol, and includes a protocol attribute translation table for exchanging information between the authentication protocol and the directory service protocol.

8. The authentication system of claim 6, wherein the directory service uses the Lightweight Directory Access Protocol (LDAP), whereby each entry in the directory service is an instance of a predefined object class defining attributes which are used by the entry, a specific object class being created for the network users, that defines the attributes necessary for authenticating the users.

9. The authentication system of claim 6, wherein the front-end is an application executed on a computer hosting the directory service.

10. The authentication system of claim 6, including several authentication protocols and one front-end for each authentication protocol.

11. A network access authentication method using a directory service containing a remote access password and a standard access password for each user of the network, including the steps of:
    receiving a user identifier and a user password entered by a user through an authentication protocol that provides information on whether the user is accessing the network locally or remotely;
    retrieving from the directory service the remote access password and the standard access password corresponding to the user identifier;
    if the authentication protocol indicates a remote access, comparing the user password to the remote access password, else comparing the user password to the standard access password; and
    granting access to the network if the comparing step is successful.

12. A network access authentication method using a directory service containing a remote access password, a standard access password, and a remote access password enable flag for each user of the network, including the steps of:
    receiving a user identifier and a user password entered by a user through an authentication protocol that provides information on whether the user is accessing the network locally or remotely;
    retrieving from the directory service the remote access password, the standard access password, and the remote access password enable flag corresponding to the user identifier;
    if the authentication protocol indicates a remote access and the remote access enable flag has an active state, comparing the user password to the remote access password, else comparing the user password to the standard access password; and granting access to the network if the comparing step is successful.

13. A network access authentication system including:

a directory service containing a remote access password and a standard access password for each user of the network;

means for receiving a user identifier and a user password entered by a user through an authentication protocol that provides information on whether the user is accessing the network locally or remotely;

means for retrieving from the directory service the remote access password and the standard access password corresponding to the user identifier;

means for comparing the user password to the remote access password if the authentication protocol indicates a remote access, else the user password to the standard access password; and means for granting access to the network if the means for comparing indicate an equality.

14. The authentication system of claim 13, wherein said means for receiving, retrieving, comparing and granting access are included in a front-end which is a client for a protocol used by the directory service and a server for the authentication protocol, and which includes a protocol attribute translation table for exchanging information between the authentication protocol and the directory service protocol.

15. A network access authentication system including:

a directory service containing a remote access password, a standard access password, and a remote access password enable flag for each user of the network;

means for receiving a user identifier and a user password entered by a user through an authentication protocol that provides information on whether the user is accessing the network locally or remotely;

means for retrieving from the directory service the remote access password, the standard access password, and the remote access password enable flag corresponding to the user identifier;

means for comparing the user password to the remote access password if the authentication protocol indicates a remote access and the remote access enable flag has an active state, else the user password to the standard access password; and means for granting access to the network if the means for comparing indicate an equality.

16. The authentication system of claim 15, wherein said means for receiving, retrieving, comparing and granting access are included in a front-end which is a client for a protocol used by the directory service and a server for the authentication protocol, and which includes a protocol attribute translation table for exchanging information between the authentication protocol and the directory service protocol.

\* \* \* \* \*

UNITED STATES PATENT AND TRADEMARK OFFICE
CERTIFICATE OF CORRECTION

PATENT NO.    : 6,539,482 B1
DATED         : March 25, 2003
INVENTOR(S)   : Marcos Ares Blanco and Regis Marco It is certified that error appears in the above-identified patent and that said Letters Patent is hereby corrected as shown below:

<u>Column 17,</u>
Line 39, please change "then" to -- the --.

Signed and Sealed this

Thirtieth Day of September, 2003

JAMES E. ROGAN
*Director of the United States Patent and Trademark Office*